United States Patent [19]
Brambilla

[11] Patent Number: 5,248,178
[45] Date of Patent: Sep. 28, 1993

[54] DOUBLE ARTICULATION FOR THE FOLDING BACKREST OF A REAR SEAT FOR MOTOR VEHICLES AND MOTOR-VEHICLE SEAT INCLUDING THE ARTICULATION

[75] Inventor: Silvio Brambilla, Grugliasco, Italy

[73] Assignee: SEPI S.p.A., Turin, Italy

[21] Appl. No.: 882,042

[22] Filed: May 13, 1992

[30] Foreign Application Priority Data

May 28, 1991 [IT] Italy .................. 91A000395

[51] Int. Cl.$^5$ ................................ B60N 2/02
[52] U.S. Cl. ........................ 296/65.1; 296/66; 296/69; 297/354; 297/378.12; 297/379
[58] Field of Search ............. 296/65.1, 66, 69; 297/354, 378, 379

[56] References Cited

U.S. PATENT DOCUMENTS

| | | | |
|---|---|---|---|
| 3,262,737 | 7/1966 | Martens | 297/379 |
| 5,015,026 | 5/1991 | Mouri | 296/65.1 |

FOREIGN PATENT DOCUMENTS

| | | |
|---|---|---|
| 3336819 | 10/1989 | European Pat. Off. . |
| 0422527 | 4/1991 | European Pat. Off. . |
| 3316024 | 11/1984 | Fed. Rep. of Germany . |
| 1182761 | 6/1959 | France . |
| 118938 | 7/1982 | Japan . |
| 832108 | 4/1960 | United Kingdom .................. 296/66 |
| 2220981 | 1/1990 | United Kingdom . |

*Primary Examiner*—Dennis H. Pedder
*Attorney, Agent, or Firm*—Edward D. Manzo; Stephen B. Heller

[57] ABSTRACT

A rear seat for a motor vehicle includes a squab, the front of which is articulated to the motor-vehicle body, and a backrest connected to the body. The backrest can adopt a vertical position of normal use, a first lowered position in which it bears on the squab, and a second lowered position in which it bears directly on the floor after the squab has been pivoted forwards. A double articulation which enables the backrest to be put into these positions includes two articulation pins connected rigidly to the backrest and an S-shaped body which is carried by the vehicle body and whose two sides define two guide tracks with arcuate profiles which are engaged by the two pins.

17 Claims, 6 Drawing Sheets

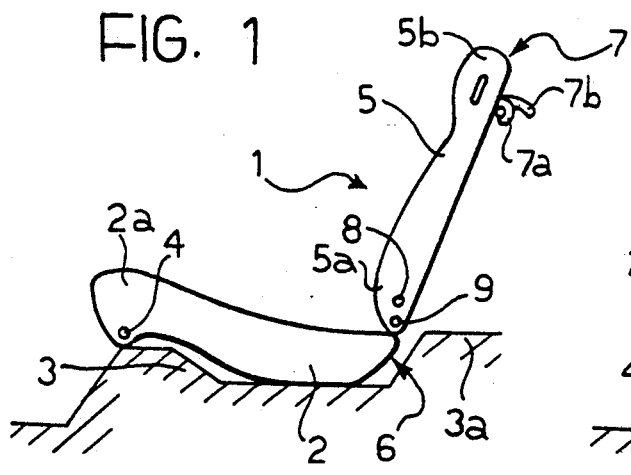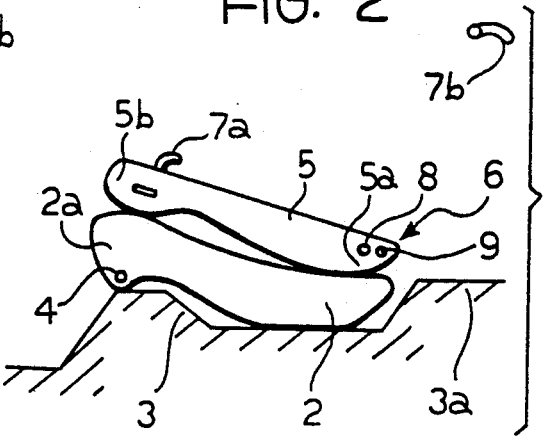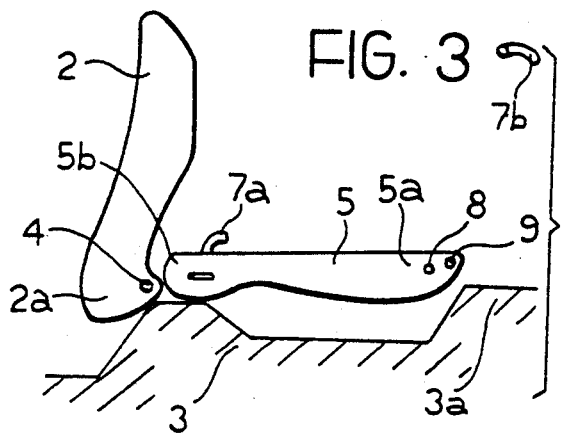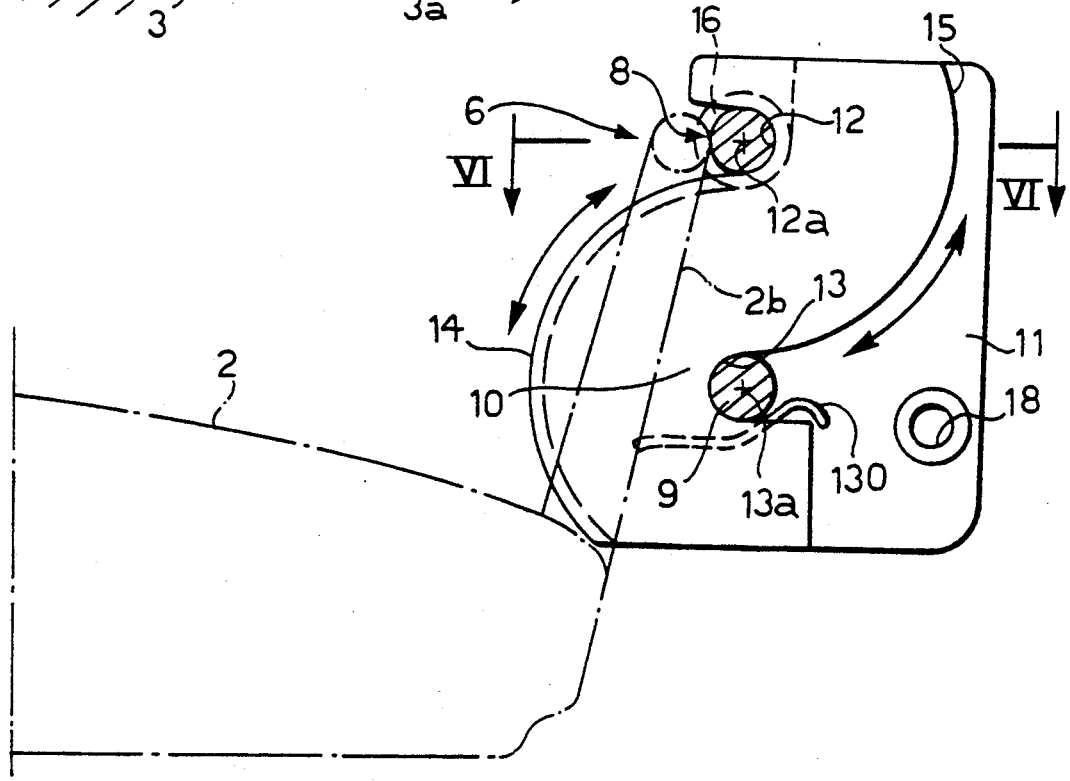

DOUBLE ARTICULATION FOR THE FOLDING BACKREST OF A REAR SEAT FOR MOTOR VEHICLES AND MOTOR-VEHICLE SEAT INCLUDING THE ARTICULATION

DESCRIPTION

1. Field of the Invention

The present invention relates to articulations for the folding backrests of rear seats for motor vehicles.

2. Prior Art

A double articulation for the folding backrest of a motor-vehicle rear seat is already known in the art, the seat including a seat element or squab the front of which is articulated to the body of the vehicle about a transverse axis so as to be movable between a position of normal use adjacent the floor and a substantially vertical position into which it is pivoted forwardly, and the articulation being intended to connect the lower portion of the backrest to the motor-vehicle body and including a first transverse articulation pin and a second articulation pin parallel to and spaced downwardly of the first so that the backrest can selectively adopt:

a substantially vertical position of normal use, a first lowered position in which the backrest bears on the squab and which can be attained as a result of the forward pivoting of the backrest about the first articulation pin, and a second lowered position in which the backrest bears directly on the floor and which ca be attained by arranging the squab in its substantially vertical position and then pivoting the backrest forwardly about the second articulation pin.

The movement of the backrest to one of the lowered positions increases the volume of the luggage compartment of the motor vehicle, the volume being greatest when the backrest is in its second lowered position in which its rear surface constitutes a substantially coplanar extension of the load platform.

A double articulation of the type indicated above is described in French patent application FR-A-2 605 565. In this known solution, the backrest is connected to the body with the interposition of a connecting member articulated both to the backrest and to the body by means of the first and second articulation pins respectively. This solution is quite complex since it also includes resilient means which oppose the pivoting of the articulation between the backrest and the connecting member, as well as remotely-releasable means for locking the articulation between the connecting member and the body.

OBJECT OF THE INVENTION

The object of the present invention is to provide an articulation of the type indicated above which has a simple structure and is constituted by fewer parts, to the benefit of its manufacturing costs and reliability in operation.

THE INVENTION

According to the invention, this object is achieved, by virtue of the fact that:

the first and second articulation pins are both fixed to the backrest of the seat and are both free to move relative to guide means which are intended to be fixed to the body, the guide means include first and second guide tracks for the first and second articulation pins respectively, the first and second guide tracks being shaped as arcs of circles centred on the axes of the second and first articulation pins respectively, with reference to the base positions of the pins when the backrest is in the vertical position, the guide tracks also have respective ends with stop surfaces which define the base positions of the two articulation pins when the backrest is in the vertical position, whereby the backrest can pivot about the first articulation pin to move to its first lowered position, in which case the first articulation pin remains in its base position and the second articulation pin moves away from its base position along the second guide track, or about the second articulation pin to move to its lowered position, in which case the second articulation pin remains in its base position and the first articulation pin moves away from its base position along the first guide track, and means are provided for restraining the first articulation pin in its base position when the squab is in its position of normal use.

The advantages which can be achieved by the present invention consist essentially of the fact that an articulation thus formed includes a limited number of mechanical components, to the benefit of its reliability in use; this results in a considerable reduction in the time and materials needed for the assembly of the seat with a consequent reduction in costs.

The invention also relates to a motor-vehicle rear seat including an articulation having the characteristics specified above.

BRIEF DESCRIPTION OF THE DRAWINGS

The invention is explained in detail below with reference to the appended drawings provided purely by way of non-limiting example, in which:

FIG. 1 is a side elevation of a motor-vehicle rear seat in its position of normal use and having a double articulation according to the invention, FIG. 2 is a side elevation of the seat of FIG. 1 with the backrest in its first lowered position, FIG. 3 is a side elevation of the seat of FIG. 1 with the backrest in the second lowered position, FIG. 4 is a schematic side elevation of the double articulation according to the invention.

DESCRIPTION OF A FIRST EMBODIMENT OF THE INVENTION

Figure 7:
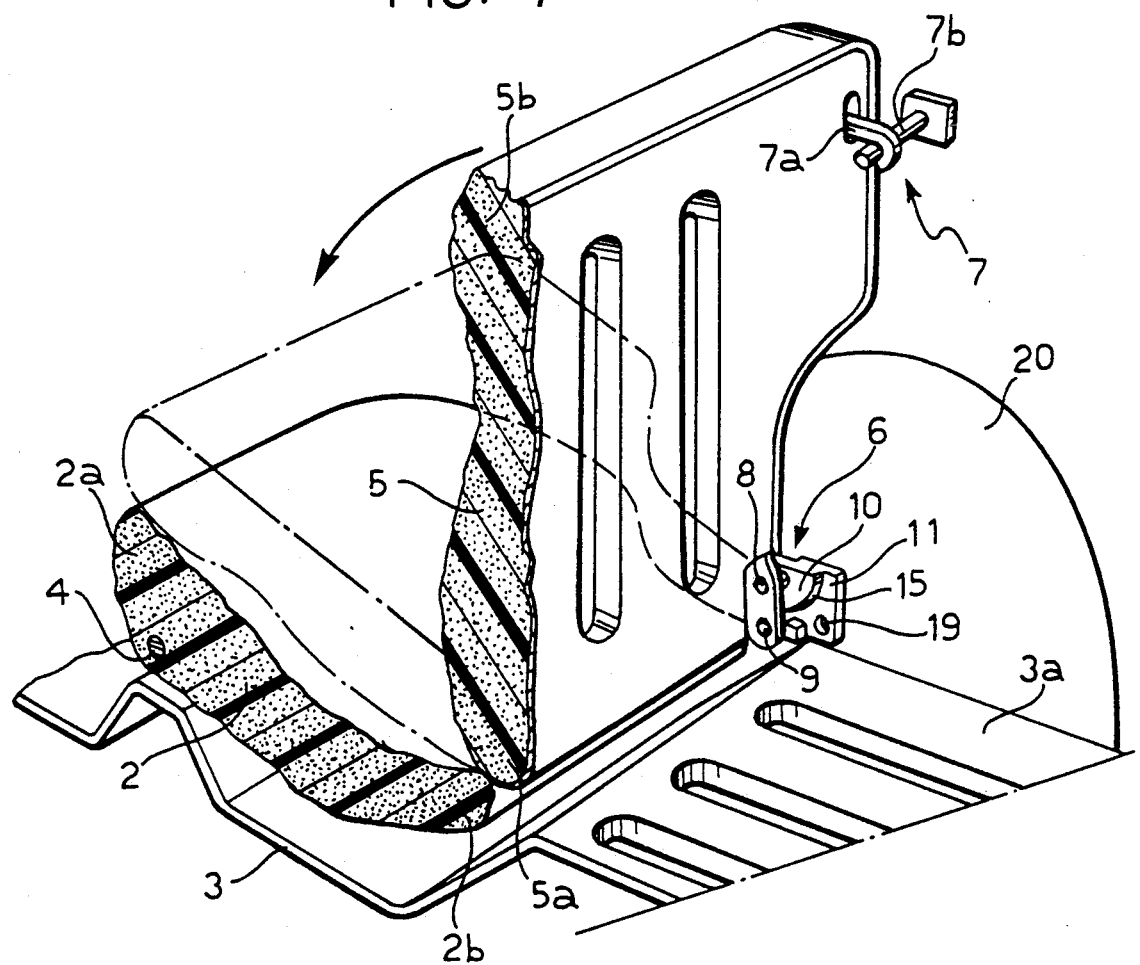

With reference initially to FIGS. 1 and 7, a rear seat for a motor vehicle, generally indicated 1, includes a squab 2 and a backrest 5.

Figure 9:
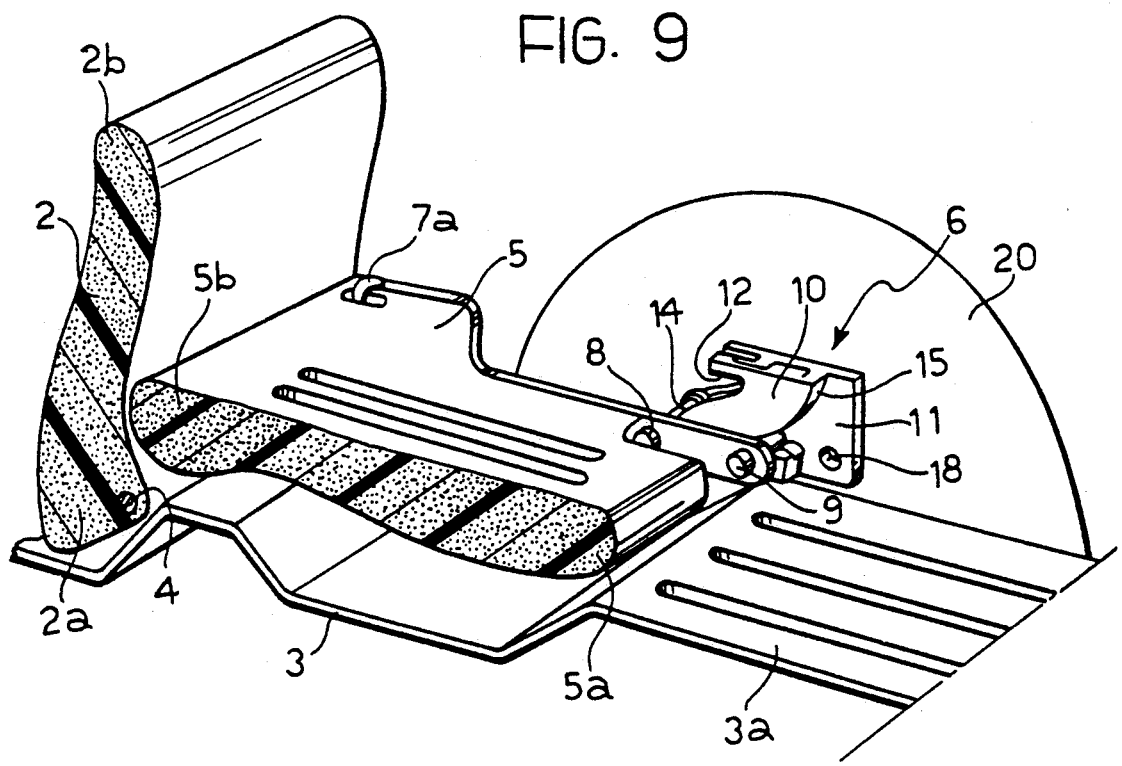

The squab 2 bears on the floor 3 of the body and, near its front end 2a, includes a transverse articulation pin 4 for enabling the squab 2 to pivot until it reaches a vertical position (FIGS. 2 and 9).

In FIGS. 1 and 7, the backrest 5 is in a substantially vertical position of normal use and its lower end 5a is connected to the motor-vehicle body on each side by an articulation, generally indicated 6.

The articulation 6 includes two parallel transverse pins, an upper pin 8 and lower pin 9, fixed to the structure of the backrest 5 and a body 10 fixed to the body of the vehicle for guiding the pins 8 and 9, as will be described in greater detail below.

The backrest 5 is kept in its position of normal use by a fixing device 7 of known type arranged near its upper end 5b and comprising, for example, a hook 7a adapted to grip a pin 7b projecting inwardly from the side of the motor-vehicle body. The structure of the device 7 is not shown in detail since, as already indicated, this device may be of any known type and does not fall within the scope of the present invention. Moreover, the fact that these details are left out of the drawings makes the latter more readily and easily understood.

Figure 8:
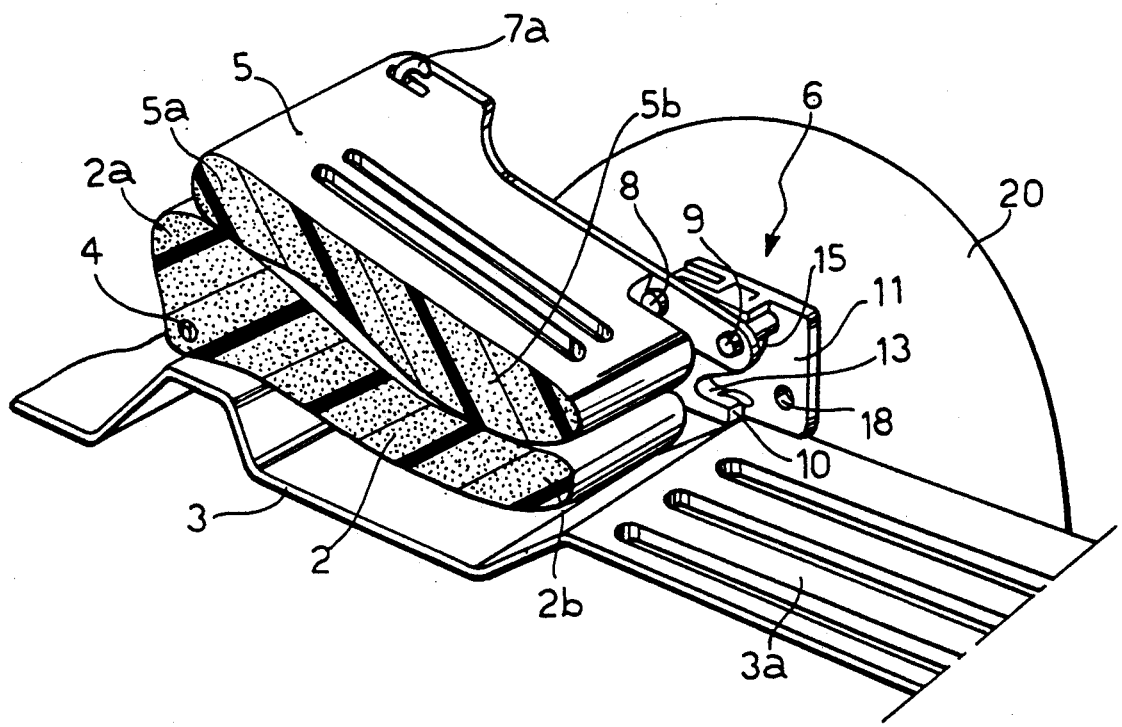

The device 6 enables the backrest 5 to be pivoted so as to rest either on top of the squab 2 (FIGS. 2 and 7) or, after the squab 2 has been pivoted forwards about the pin 4, directly on the floor 3 of the body so as to constitute an extension of the rear load platform 3a (FIGS. 3 and 8).

Figure 5:
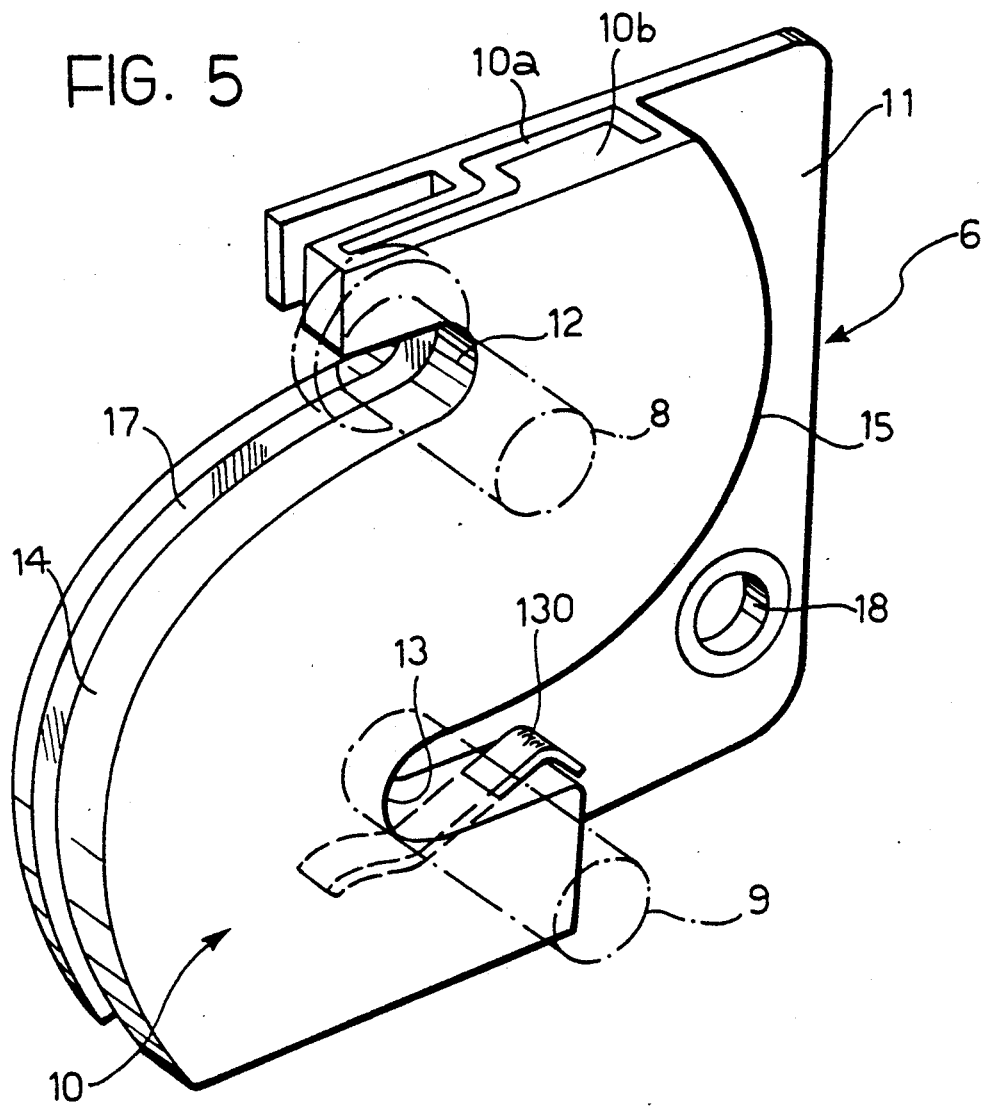
FIG. 5 is a perspective view of the device of FIG. 4.
Figure 6:
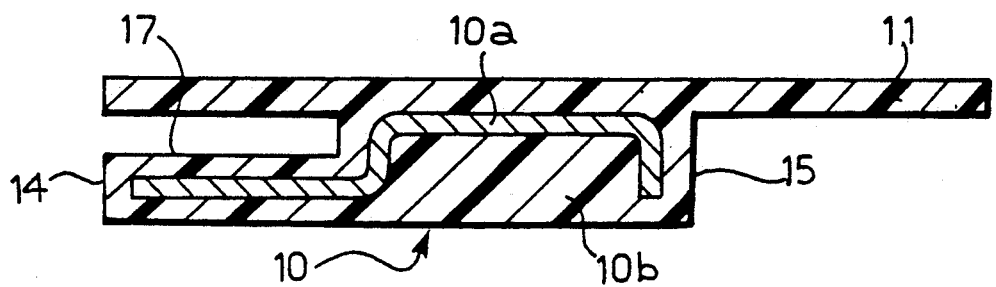
FIG. 6 is a section taken on the line VI-VI of FIG. 5, FIGS. 7, 8 and 9 are partially-sectioned perspective views showing the seat in the positions of FIGS. 1, 2 and 3.

As shown in greater detail in FIGS. 4, 5 and 6, the guide body 10 is shaped substantially like a reversed S and includes a metal core 10a incorporated in a plastics body 10b including a support plate 11 with holes 18 (only one of which is shown) for the engagement of screws, not shown, for fixing it to a vertical portion of the body beside the backrest 5.

The two sides of the S-shaped body define two guide tracks 14 and 15 the ends of which have respective stop surfaces in the form of circular seats 12 and 13 having axes 12a and 13a lying in a transverse plane substantially perpendicular to the floor 3 of the motor vehicle. The guide tracks 14 and 15 have circular profiles whose centres of curvature coincide with the axes 13a and 12a respectively (see in particular FIG. 4). The end of the pin 8 has an enlarged head forming an annular projection 16 which is partially engaged in a groove 17 (FIG. 5) adjacent the track 14 so as to prevent the backrest 5 from moving sideways relative to the motor-vehicle body.

When the backrest 5 is in its position of normal use, the pins 8 and 9 are in their base positions engaged in the seat 12 and the seat 13 respectively (see FIG. 4). The squab 2 has a stop member 2b which is in contact with the pin 8 when the squab is in its normal position, so as to prevent the pin 8 from moving away from its base position. Moreover, the body 10 has a resilient blade 130 which is resiliently deformed by the pin 9 when it moves from its base position.

By virtue of the shape of the element 10, when the pin 8 is in its base position, the pin 9 can move along the track 15 following an arcuate path; similarly, when the pin 9 is in its base position, the pin 8 can move along the track 14 following an arcuate path about the pin 9.

In operation, in order to move the backrest 5 to its first lowered position, the hook 7b is released from the pin 7a and the top 5b of the seat is pushed forwards. Since the squab is in its normal position with the stop member holding the pin 8 in the seat 12, the backrest 5 can pivot only about that pin, overcoming the opposition of the blade 130. The backrest 5 stops when it bears on the squab 2 (FIGS. 2 and 8). During the movement of the backrest, the pin 9 slides along the guide track 15.

The backrest can be returned to its erect position in a similar manner.

In order to move the backrest 5 to its second lowered position, the squab 2 is first pivoted about the pin 4 until it is arranged vertically as shown in FIGS. 3 and 9. In this configuration, the backrest no longer meets any resistance from the stop member 2b of the squab 2 and, if its top is pushed after the fixing device 7 has been released, it pivots about the lower pin 9 which is restrained by the resilient blade 130.

The articulation 6 described specifically in this description and illustrated in the appended drawings includes a flat, reversed-S-shaped element 10 for association with the right-hand side of a seat backrest and of a motor car body, a similar S-shaped body for use on the left-hand side of the seat and the body, however, will have a shape symmetrical to that described.

DESCRIPTION OF A SECOND EMBODIMENT

Figure 10:
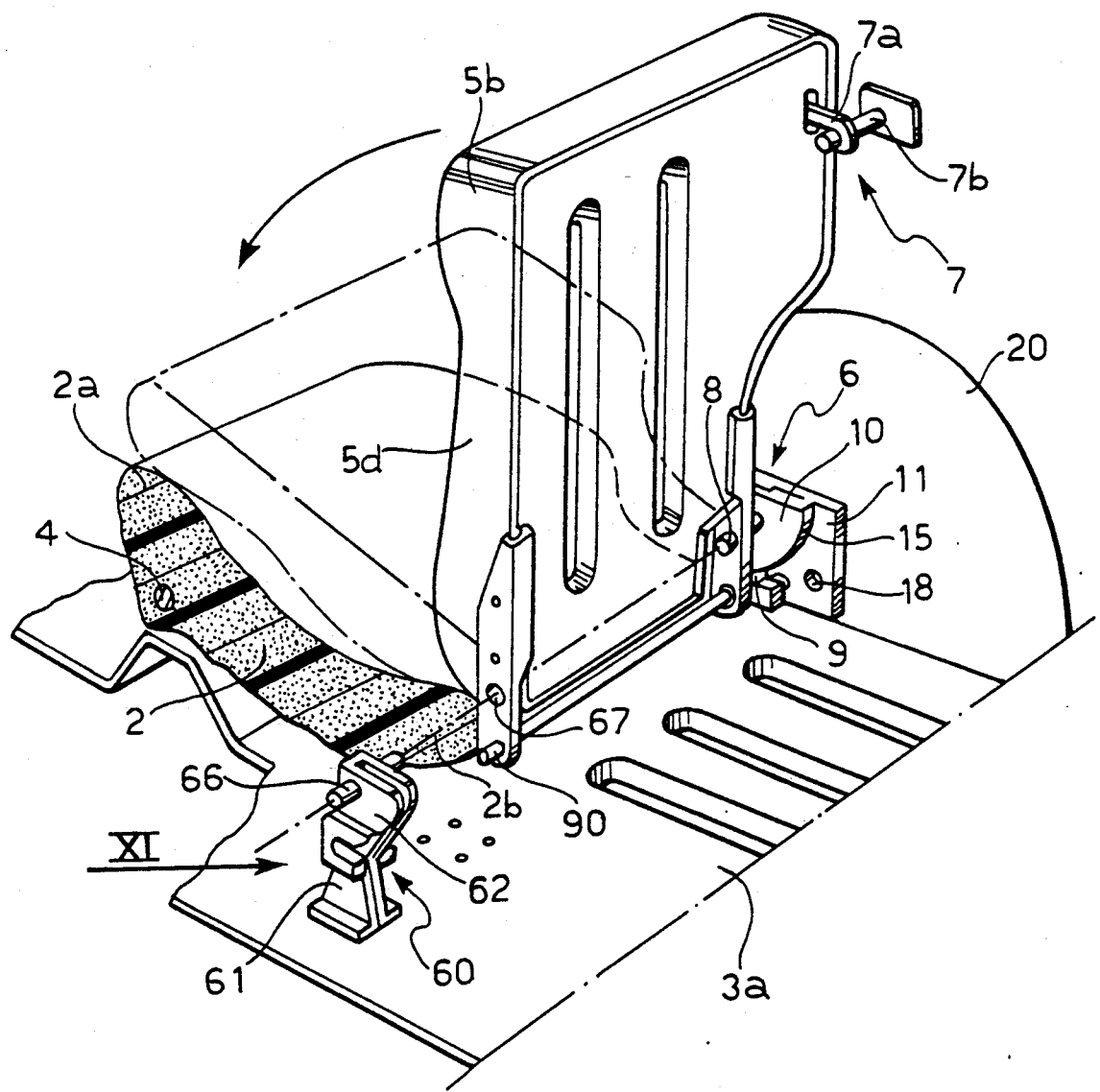
FIG. 10 shows a variant of FIG. 7.

FIG. 10 relates to a variant for a seat with a single squab and a backrest including two separate portions 5d which can be folded independently (only one of the portions 5d is visible in FIG. 10). In this embodiment, each of the outer sides of the backrest is connected to the body by means of an articulation 6. The facing sides of the backrest portions 5d, however, are connected to the body by a connecting device 60 which is indicated by the arrow XI in FIG. 10 and is shown on an enlarged scale in FIGS. 11 and 12.

Figure 11:
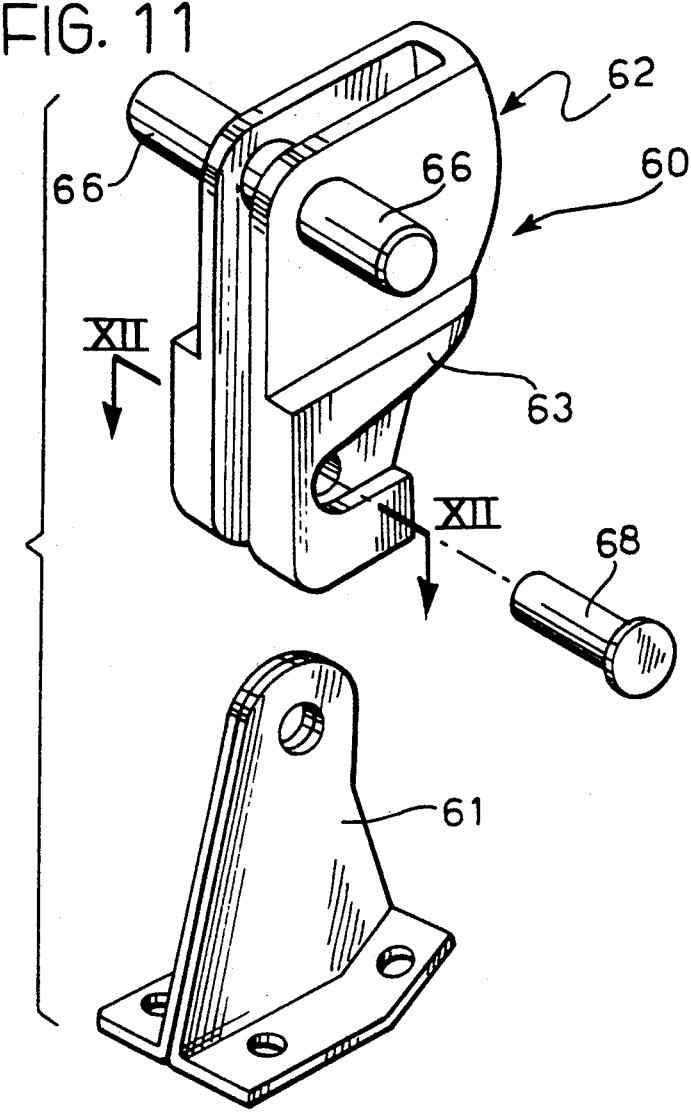
FIG. 11 is an exploded perspective view of a detail of FIG. 10.
Figure 12:
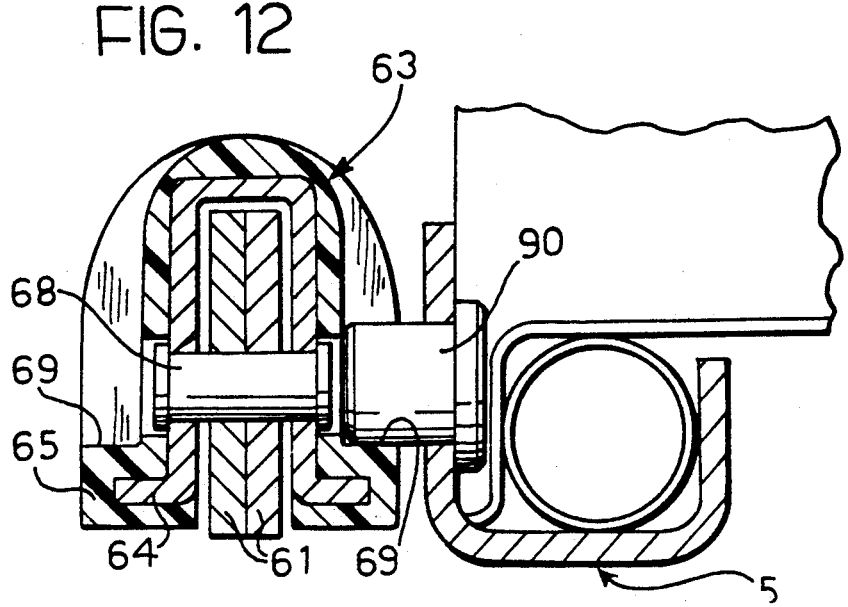
FIG. 12 is a section taken on the line XII-XII of FIG. 11.

The device 60 comprises a bracket 61 fixed to the floor of the body and a connecting member 62 which is articulated to the bracket 61 and to the structures of both the right-hand and left-hand portions 5d of the backrest. With reference to FIGS. 11 and 12, the connecting member 62 has a U-shaped body 63 including a U-shaped, bent metal plate 64 covered in plastics material. The two arms 65 of the U-shaped body 63 have opposed pins 66 which engage respective holes 67 in the facing sides of the structures of the two backrest portions 5d (see FIG. 10, in which one of the holes is visible). The holes 67 are aligned on the axis 12a of the two side articulations 6. As already stated, the body 63 is also articulated to the bracket 61 by a pin 68. Finally, the body 63 also has two lateral guide tracks 69 which correspond to the tracks 15 of the articulations 6 and which are engaged by two pins 90 (only one of which is visible in the drawings) carried by the two adjacent sides of the backrest portions 5d and aligned on the axis of the pin 9 of each articulation 6. If both of the backrest portions 5d are to be folded, the operation is similar to that described above with reference to FIGS. 8 and 9. If the squab is kept in its normal position, the connecting member 62 cannot move since the pins 66 are restrained by the backrest because the pins 8 are stopped by the squab. The backrest can thus be folded by being pivoted about the axis 12a. The pins 9 slide along the tracks 15 and the pins 90 slide along the tracks 69 of the body 63. When the squab 2 is tipped up, both the backrest portions can be pivoted about the axis 13a. In this case, the connecting member 62 pivots relative to the bracket 61. If only one portion 5d, for example, the right-hand portion, that is, the one shown in FIG. 10, is to be folded, the squab 2 has to be kept in its normal position. The portion 5d can thus pivot about the axis 13a, overcoming the opposition of the resilient blades 130 of the two lateral articulations 6. The pins 9 slide along the guides 15 whilst the pin 90 of the portion 5d which is lowered slides along its track 69.

Naturally, the principle of the invention remaining the same, the forms of embodiment and details of construction may be varied widely, without thereby departing from the scope of the present invention.

I claim:

1. For use in a motor vehicle having a body, a floor, a seat pivotally connected to the body about a transverse axis located at a forward portion of the seat so as to be movable between a portion of normal use adjacent to the floor and a substantially vertical position, and a foldable backrest.

a double articulation mechanism connecting a lower portion of the backrest to the body having a first transverse articulation pin and a second transverse articulation pin parallel to and spaced downwardly from the first transverse articulation pin to pivot the backrest between a substantially vertical position of normal use, a first lowered position in which the backrest pivots forwardly about the first transverse articulation pin so that the backrest bears on the seat, and a second lowered position in which the backrest pivots forwardly about the second transverse articulation pin after the seat is moved to a substantially vertical position so that the backrest bears on the floor, the double articulation mechanism comprising:

a guide assembly fixed to the body, the guide assembly having first and second guide tracks receiving the first and second transverse articulation pins, respectively, to permit free-relative motion between the guide assembly and the transverse articulation pins, the guide tracks being shaped as arcs and having associated stop surfaces, the arc of the first guide track being centered on the axis of the second transverse articulation pin, the arc of the second guide track being centered on the axis of the first transverse articulation pin, and the stop surfaces engaging the transverse articulation pins when the backrest is in the vertical position, to define base positions for the transverse articulation pins, whereby the backrest is pivotable about the first transverse articulation pin to move to the first lower position wherein the first transverse articulation pin remains in its base position and the second transverse articulation pin moves out of its base position along the second guide track, and is pivotable about the second transverse articulation pin to move to the second lower position wherein the second transverse articulation pin remains in its base position and the first transverse articulation pin moves out of its base position along the first guide track.

2. A double articulation mechanism according to claim 1 in which the stop surface associated with the second transverse articulation pin includes a resilient member for restraining the second transverse articulation pin in its base position, the resilient member enabling the second articulation pin to move away from its base position only as a result of the application of a predetermined force.

3. A double articulation mechanism according to claim 1 in which the guide assembly comprises a substantially flat s-shape body having two sides which define the first and second guide tracks respectively.

4. A double articulation mechanism according to claim 3 wherein the guide assembly further comprises a metal core incorporated in a plastic body and including a support plate fixed to the motor vehicle body.

5. A double articulation mechanism according to claim 1 wherein the stop surface associated with the first guide track is secured to the seat.

6. A double articulation mechanism according to claim 1 wherein the stop surfaces associated with the guide tracks have circular cross sections.

7. A double articulation mechanism according to claim 6 wherein the axes of the first and second transverse articulation pins are in a substantially vertical plane defined by the stop surfaces when the backrest is in the vertical position.

8. A double articulation mechanism according to claim 3 wherein one of the guide tracks includes a groove and the corresponding transverse articulation pin has an enlarged head for engaging the groove.

9. A seat and foldable backrest assembly for use in a motor vehicle having a body and a floor, comprising:

a pivotal connector connecting the seat to the body about a transverse axis located at a forward portion of the seat so as to be movable between a position of normal use adjacent to the floor and a substantially vertical position;

a double articulation mechanism connecting a lower portion of the backrest to the body;

a first transverse articulation pin secured to the backrest;

a second transverse articulation pin secured to the backrest parallel to and spaced downwardly from the first transverse articulation pin to pivot the backrest between a substantially vertical position of normal use, a first lowered position in which the backrest pivots forwardly about the first transverse articulation pin so that the backrest bears on the seat, and a second lowered position in which the backrest pivots forwardly about the second transverse articulation pin after the seat is moved to a substantially vertical position so that the backrest bears on the floor;

the double articulation mechanism including a guide assembly fixed to the body, the guide assembly having first and second guide tracks receiving the first and second transverse articulation pins respectively, to permit free-relative motion between the guide assembly and the transverse articulation pins, the guide tracks being shaped as arcs and having associated stop surfaces, the arc of the first guide track being centered on the axis of the second transverse articulation pin, the arc of the second guide track being centered on the axis of the first transverse articulation pin, and the stop surfaces engaging the transverse articulation pins when the backrest is in the vertical position, to define base positions for the transverse articulation pins, whereby the backrest is pivotable about the first transverse articulation pin to move to the first lower position wherein the first transverse articulation pin remains in its base position and the second transverse articulation pin moves out of its base position along the second guide track, and is pivotable about the second transverse articulation pin to move to the second lower position wherein the second transverse articulation pin remains in its base position and the first transverse articulation pin moves out of its base position along the first guide track.

10. A seat and foldable backrest assembly according to claim 9 in which the stop surface associated with the second transverse articulation pin of the double articulation mechanism includes a resilient member for restraining the second transverse articulation pin in its base position, the resilient member enabling the second articulation pin to move away from its base position only as a result of the application of a predetermined force.

11. A seat and foldable backrest assembly according to claim 9 in which the guide assembly of the double articulation mechanism comprises a substantially flat s-shape body having two sides which define the first and second guide tracks respectively.

12. A seat and foldable backrest assembly according to claim 11 wherein the guide assembly of the double articulation mechanism further comprises a metal core incorporated in a plastic body and including a support plate fixed to the motor vehicle body.

13. A seat and foldable backrest assembly according to claim 9 wherein the stop surface associated with the first guide track of the double articulation mechanism is secured to the seat.

14. A seat and foldable backrest assembly according to claim 9 wherein the stop surfaces associated with the guide tracks of the double articulation mechanism have circular cross sections.

15. A seat and foldable backrest assembly according to claim 14 wherein the axes of the first and second transverse articulation pins are in a substantially vertical plane defined by the stop surfaces of the double articulation mechanism when the backrest is in the vertical position.

16. A seat and foldable backrest assembly according to claim 11 wherein one of the guide tracks of the double articulation mechanism includes a groove and the corresponding transverse articulation pin has an enlarged head for engaging the groove.

17. A seat and backrest assembly according to claim 9 wherein the backrest comprises two side-by-side, independently foldable portions, the adjacent sides of the two portions being connected to the body by a connecting member having two axes of articulation that coincide with the axes of the firs and second transverse articulation pins of each foldable portion.

* * * * *